(12) United States Patent
Kanji (10) Patent No.: US 10,267,098 B2
(45) Date of Patent: Apr. 23, 2019

(54) DRILL STRING CONSTANT VELOCITY CONNECTION

(71) Applicant: Halliburton Energy Services, Inc., Houston, TX (US)

(72) Inventor: Karim N. Kanji, Calgary (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 727 days.

(21) Appl. No.: 14/427,861

(22) PCT Filed: Oct. 17, 2012

(86) PCT No.: PCT/US2012/060539
§ 371 (c)(1),
(2) Date: Mar. 12, 2015

(87) PCT Pub. No.: WO2014/062172
PCT Pub. Date: Apr. 24, 2014

(65) Prior Publication Data
US 2015/0211308 A1    Jul. 30, 2015

(51) Int. Cl.
*E21B 17/05* (2006.01)
*E21B 7/06* (2006.01)
(Continued)

(52) U.S. Cl.
CPC ............... *E21B 17/05* (2013.01); *E21B 4/02* (2013.01); *E21B 7/067* (2013.01); *E21B 19/18* (2013.01); *F16D 3/265* (2013.01); *F16D 3/30* (2013.01)

(58) Field of Classification Search
CPC . E21B 17/05; E21B 17/02; E21B 4/02; E21B 7/067
(Continued)

(56) References Cited

U.S. PATENT DOCUMENTS 2,694,549 A    11/1954   James
3,062,024 A    11/1962   Bania
(Continued)

FOREIGN PATENT DOCUMENTS

CN    2526495    12/2002
RU    2037435    6/1995
(Continued)

OTHER PUBLICATIONS

International Search Report and Written Opinion of PCT Application No. PCT/US2012/060539 dated Apr. 8, 2013: pp. 1-9.

*Primary Examiner* — D. Andrews
*Assistant Examiner* — Manuel C Portocarrero
(74) *Attorney, Agent, or Firm* — Chamberlain Hrdlicka (57) ABSTRACT

A constant velocity connection for use in a drill string can include at least one ball-and-socket joint, and an insert rotationally received in an opening formed laterally through a ball of the joint. A method of constructing a constant velocity connection can include installing an insert in an opening formed in a ball of at least one ball-and-socket joint of the constant velocity connection, and allowing the insert to rotate in the opening about a lateral axis. A drill string can include a drilling motor, a drill bit, and a constant velocity connection connected between the drilling motor and the drill bit, the constant velocity connection including at least one ball-and-socket joint, and an insert rotationally received in an opening formed laterally through a ball of the joint.

24 Claims, 6 Drawing Sheets

(51) Int. Cl.
 *E21B 19/18* (2006.01)
 *E21B 4/02* (2006.01)
 *F16D 3/26* (2006.01)
 *F16D 3/30* (2006.01)

(58) Field of Classification Search
 USPC .......................................................... 464/121
 See application file for complete search history.

(56) References Cited

U.S. PATENT DOCUMENTS

| | | |
|---|---|---|
| 4,145,896 A | 3/1979 | Pringle |
| 4,263,788 A | 4/1981 | Beimgraben |
| 4,772,246 A | 9/1988 | Wenzel |
| 5,277,659 A | 1/1994 | Cornay |
| 5,288,271 A | 2/1994 | Nelson et al. |
| 5,467,834 A | 11/1995 | Hughes et al. |
| 5,569,089 A * | 10/1996 | Signorelli ................. F16D 3/30 464/112 |
| 6,742,750 B2 | 6/2004 | Burr |
| 7,044,240 B2 | 5/2006 | McNeilly |
| 8,033,920 B1 * | 10/2011 | Benson ................... F16D 3/221 175/107 |
| 2004/0016574 A1 | 1/2004 | Green |
| 2009/0275415 A1 | 11/2009 | Prill et al. |
| 2012/0228035 A1 | 9/2012 | Gillis |

FOREIGN PATENT DOCUMENTS

| | | |
|---|---|---|
| RU | 2156208 | 9/2000 |
| WO | 2011080292 | 7/2011 |

\* cited by examiner

DRILL STRING CONSTANT VELOCITY CONNECTION

TECHNICAL FIELD

This disclosure relates generally to equipment utilized and operations performed in conjunction with a subterranean well and, in one example described below, more particularly provides a drill string constant velocity connection.

BACKGROUND

Drilling bottom hole assemblies (BHA's) can include a drilling motor which provides for rotation of a drill bit at an end of a drill string. However, if a drilling BHA includes a positive displacement Moineau-type drilling motor, a rotor of the drilling motor may have an articulating, planetary and/or epicyclic motion, which is preferably transformed into rotary motion of the drill bit. Furthermore, if a bent housing is used in the drilling BHA, rotation about one centerline of the BHA is preferably transformed into rotation about another centerline which is not aligned with the first centerline.

Therefore, it will be appreciated that improvements are continually needed in the art of constructing constant velocity connections for transmitting rotation and torque between a drilling motor and a drill bit.

DETAILED DESCRIPTION

Figure 1:
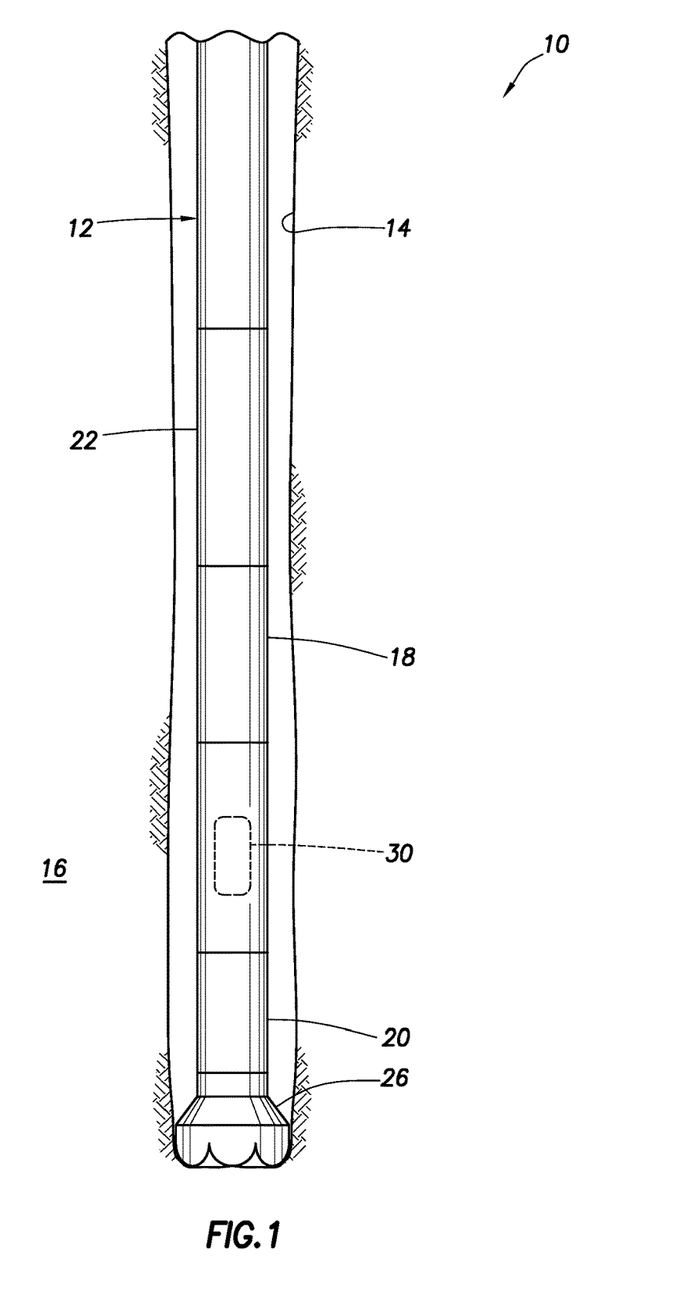
FIG. 1 is a representative partially cross-sectional view of a well drilling system and associated method which can embody principles of this disclosure.

Representatively illustrated in FIG. 1 is a system 10 for drilling a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a drill string 12 is being used to drill a wellbore 14 in an earth formation 16. The wellbore 14 may extend in any direction, and the drill string 12 could be any type of drill string (e.g., drill pipe, coiled tubing, made of composite materials, wired or "intelligent" conduit, etc.). The scope of this disclosure is not limited to any particular type of drilling operation or drill string.

A drilling motor 18 is interconnected in the drill string 12. In this example, the drilling motor 18 can be a positive displacement motor which produces a desired rotational speed and torque for well drilling operations. A Moineau-type progressive cavity "mud" pump of the type well known to those skilled in the art may be used for the drilling motor 18.

A bearing assembly 20 transmits the rotational output of the motor 18 to a drill bit 26 connected at a distal end of the drill string 12. In this example, the bearing assembly 20 rotationally supports an output shaft (not visible in FIG. 1) which transmits rotation and torque to the drill bit 26 for drilling the wellbore 14. In other examples, bearing assembly 20 could be integrated with the drilling motor 18, or the bearing assembly could be otherwise positioned.

A measurement-while-drilling (MWD) and/or logging-while-drilling (LWD) system 22 can be used for measuring certain downhole parameters, and for communicating with a remote location (such as, a land or water-based drilling rig, a subsea facility, etc.). Such communication may be by any means, for example, wired or wireless telemetry, optical fibers, acoustic pulses, pressure pulses, electromagnetic waves, etc.

Although the drill string 12 is described herein as including certain components, it should be clearly understood that the scope of this disclosure is not limited to any particular combination or arrangement of components, and more or less components may be used, as suitable for particular circumstances. The drill string 12 is merely one example of a drill string which can benefit from the principles described herein.

Figure 2:
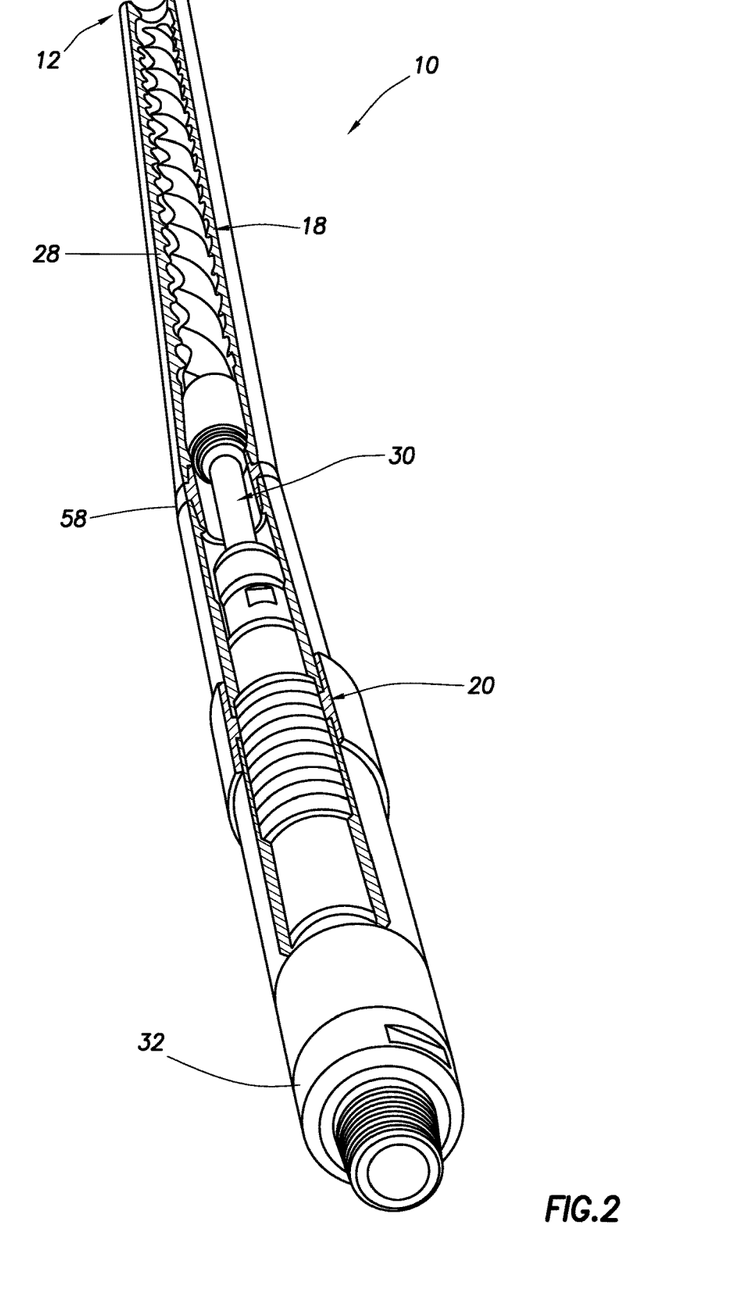
FIG. 2 is a representative enlarged scale partially cross-sectional perspective view of a drilling motor assembly which may be used in the system and method of FIG. 1, and which can embody the principles of this disclosure.

Referring additionally now to FIG. 2, the drilling motor 18 and bearing assembly 20 are representatively illustrated apart from the remainder of the drill string 12. In this example, the drilling motor 18 includes a power section 28 with a rotor contained in a stator, whereby fluid flow through the power section causes the rotor to rotate relative to the stator.

The rotor is connected to an output shaft, which in this example includes a constant velocity connection 30 for transferring the rotor rotation via the bearing assembly 20 to a bit connector 32. The drilling motor 18 in this example may be similar in most other respects to a SPERRY-DRILL™ positive displacement drilling motor marketed by Halliburton Energy Services, Inc. of Houston, Tex. USA. However, other types of drilling motors (e.g., other positive displacement motors, turbine motors, etc.) may be used in other examples.

Figure 3:
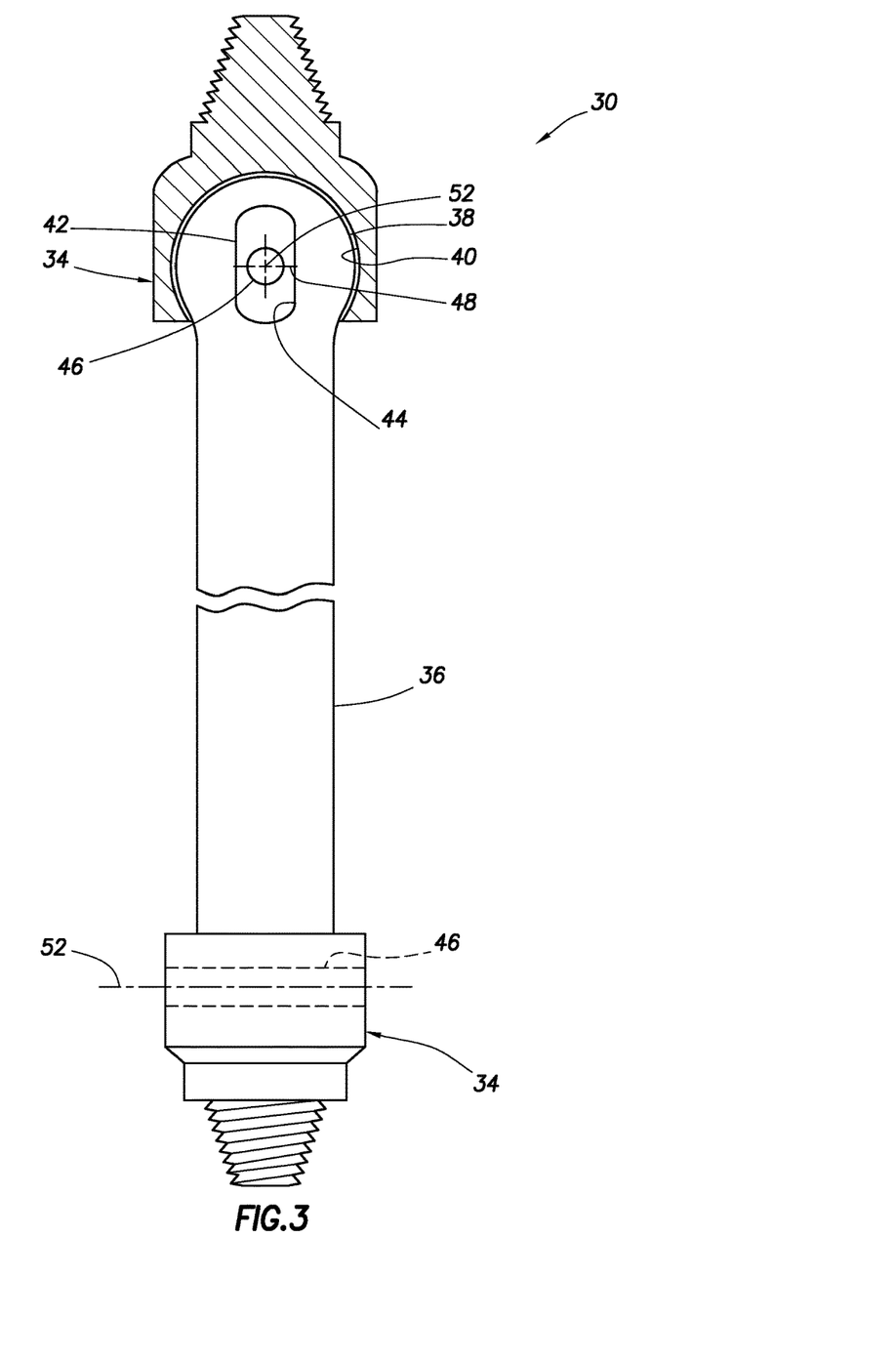
FIG. 3 is a representative further enlarged scale partially cross-sectional side view of a constant velocity connection which may be used in the drilling motor assembly of FIG. 2, and which can embody the principles of this disclosure.

Referring additionally now to FIG. 3, an example of the constant velocity connection 30 is representatively illustrated apart from the drilling motor 18 and the bearing assembly 20. In this example, the constant velocity connection 30 includes two ball-and-socket joints 34 positioned at opposite ends of a shaft 36, but other numbers of these components could be used in other examples.

Each of the ball-and socket joints 34 includes a ball (e.g., a generally spherical structure) 38 received in a socket 40. The balls 38 are connected to the opposite ends of the shaft 36, by integrally forming the balls on the ends of the shaft, separately forming and then connecting the balls, etc. The scope of this disclosure is not limited to any particular way of constructing the various components of the connection 30.

An insert 42 is received in an opening 44 formed laterally through each ball 38. The insert 42 and opening 44 are shaped, so that the insert can rotate about a lateral axis 48 perpendicular to the opening. For example, the insert 42 may be in the form of a disk or a short cylinder.

Note that the ball-and-socket joints 34 are offset 90 degrees rotationally from each other. This is to cancel out variations in rotational speed between the two joints 34.

Figure 4:
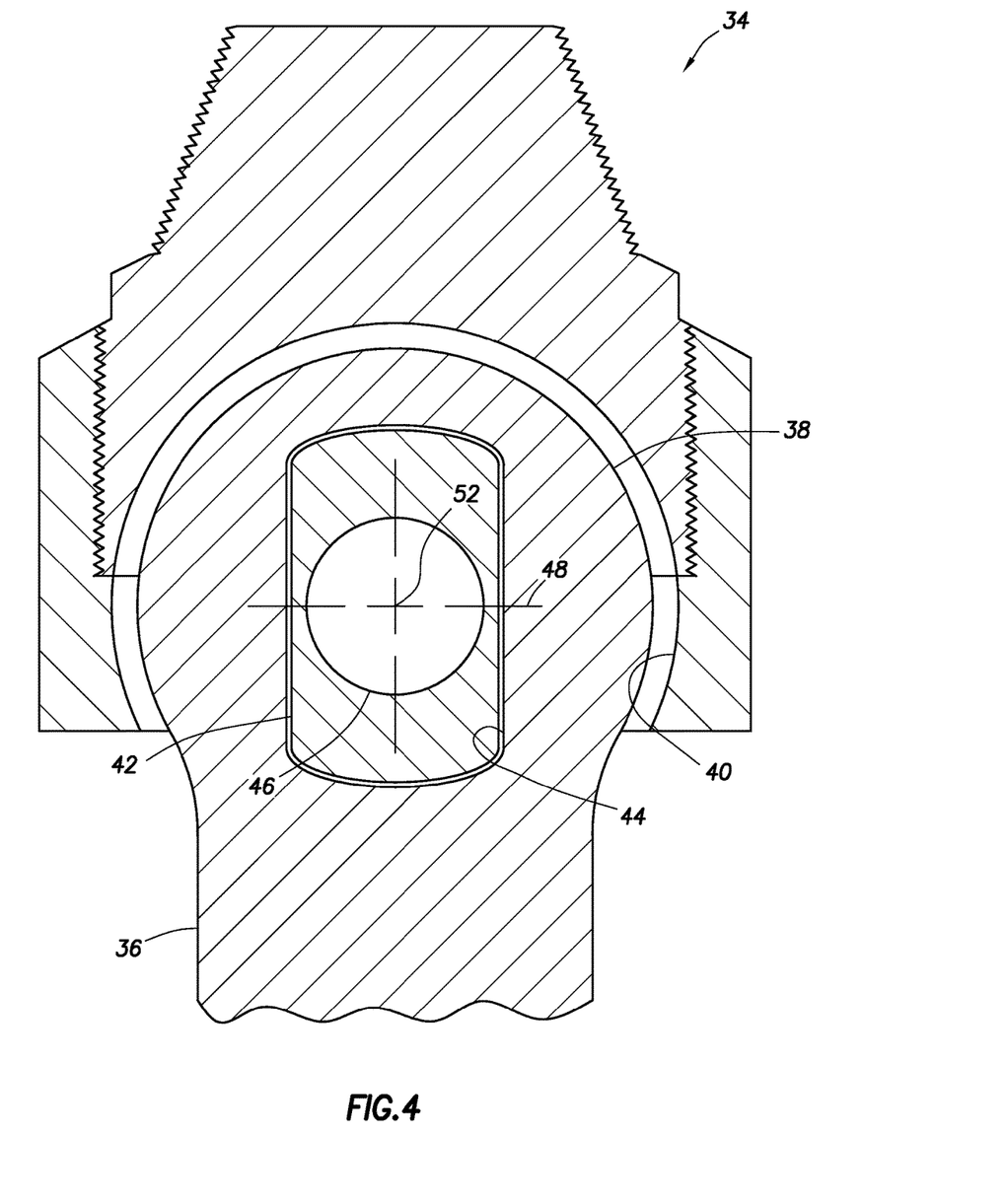
FIG. 4 is a representative further enlarged scale cross-sectional view of a ball-and-socket joint of the constant velocity connection.

Referring additionally now to FIG. 4, an example of one of the ball-and-socket joints 34 is representatively illustrated apart from the remainder of the constant velocity connection 30. In this view, it may be clearly seen that a pin or journal 46 extends laterally through the insert 42, parallel to the opening 44 and extending along an axis 52 perpendicular to the axis 48.

As described more fully below, the socket 40 rotates with the insert 42 about the axis 48 relative to the ball 38, and also rotates with or about the journal 46 about the axis 52. In this manner, the joint 34 can conveniently accommodate a planetary or epicyclic motion of the rotor in the drilling motor 18.

Figure 5:
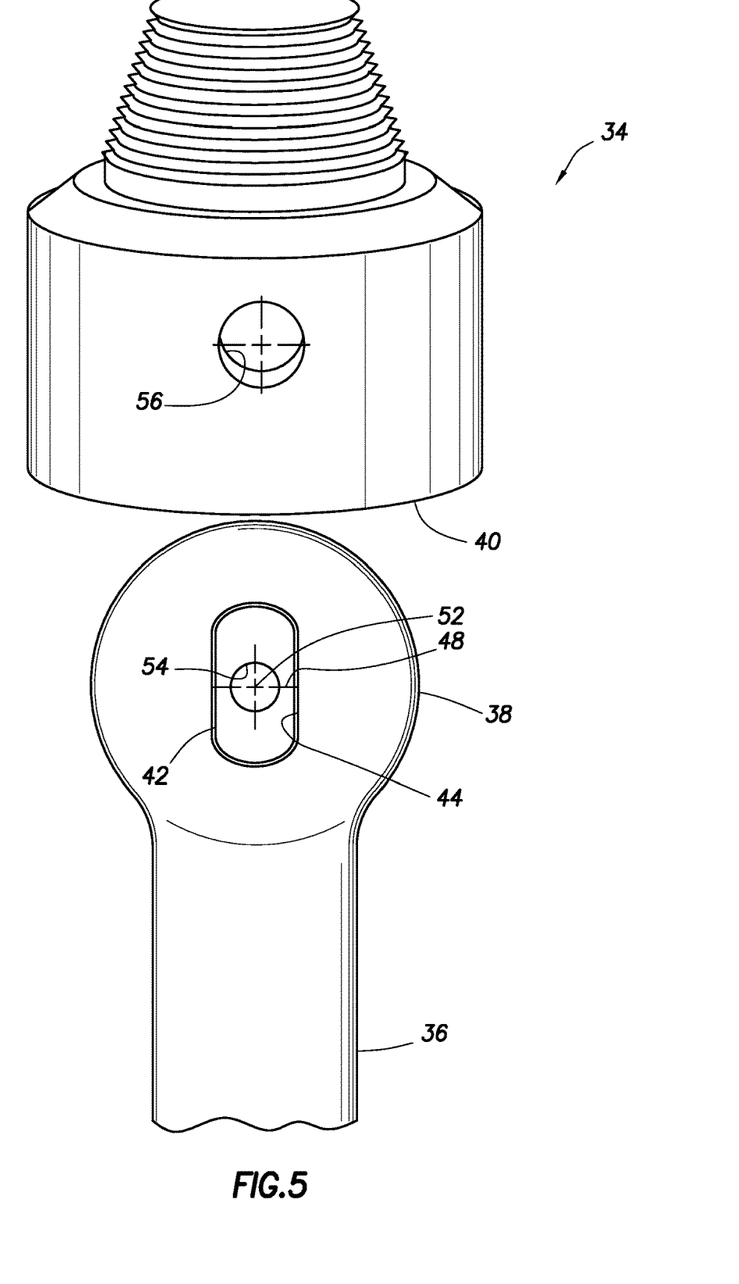
FIG. 5 is a representative exploded view of the ball-and-socket joint of FIG. 4.

Referring additionally now to FIG. 5, an exploded view of the ball-and-socket joint 34 is representatively illustrated. With this view, a method of constructing the connection 30 can be more easily understood.

As depicted in FIG. 5, the insert 42 has been inserted into the opening 44, which extends along the axis 52. The insert 42 is free to rotate about the axis 48 in the ball 38 at this point.

The ball 38 is then received in the socket 40. The socket 40 may be made up of multiple separate components, in order to provide for retaining the ball 38 in the socket, so that the socket can rotate relative to the ball.

After the ball 38 is received in the socket 40, openings 54, 56 formed laterally through the insert 42 and socket 40, respectively, are aligned. The journal 46 is then installed in the aligned openings 54, 56 and secured (e.g., using snap rings, fasteners, press fitting, welding, etc.), so that the socket 40 now rotates about the axis 52.

Thus, when the joint 34 is assembled, the socket 40 can rotate about each of the lateral axes 48, 52 relative to the ball 38. The socket 40 may rotate with or about the journal 46.

Note that the method described above is just one example of a variety of different techniques for assembling the joint 34. Other steps, other sequences of steps, other combinations of steps, etc., may be used in keeping with the scope of this disclosure.

Figure 6:
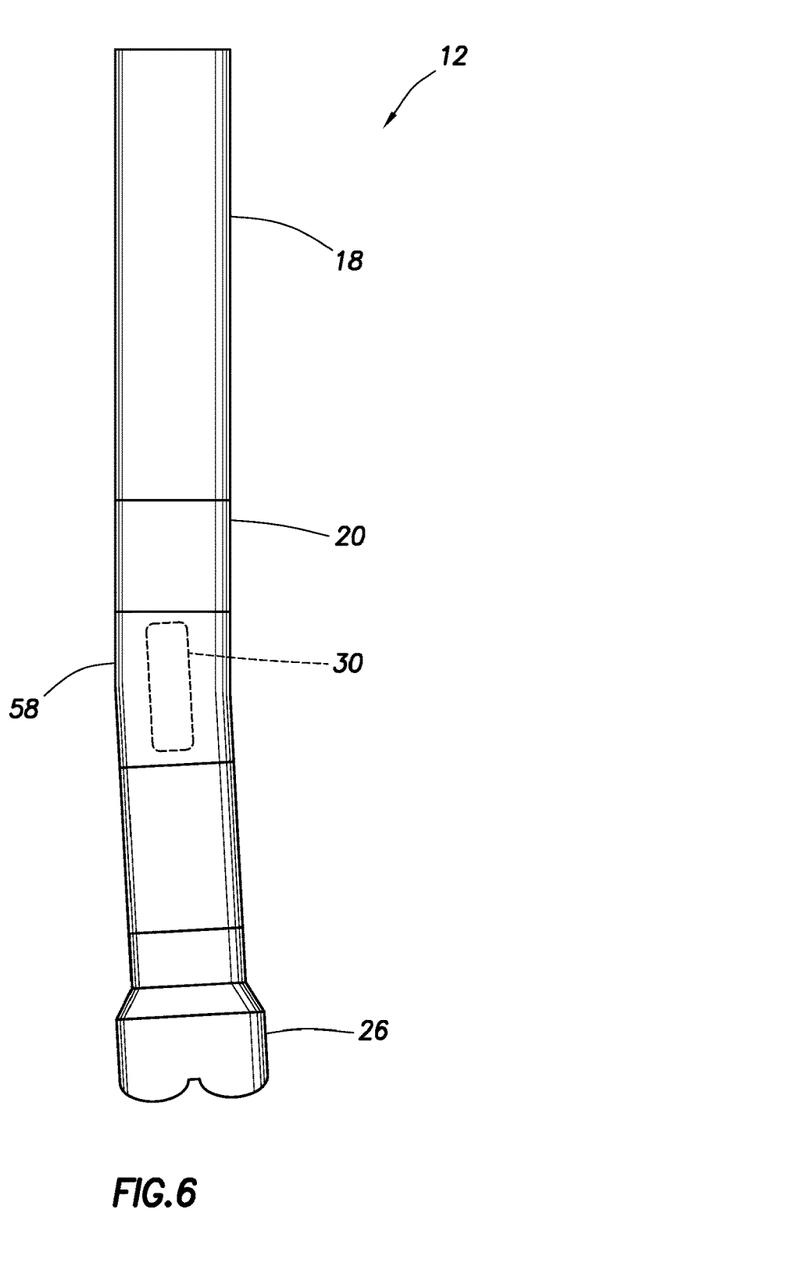
FIG. 6 is a representative side view of another example of the drilling motor assembly.

Referring additionally now to FIG. 6, another example of the drill string 12 is representatively illustrated. In this example, the drilling motor 18 comprises a turbine-type motor. Another difference over the drill string 12 of FIG. 1 is that the drill string 12 of FIG. 6 has the bearing assembly 20 connected between the drilling motor 18 and the constant velocity connection 30.

Yet another difference in the FIG. 6 configuration is that the constant velocity connection 30 is positioned in a bent housing 58. Thus, the constant velocity connection 30 is used in this example to transfer rotation and torque about a centerline of the drilling motor 18 to the drill bit 26, a centerline of which is not aligned with the drilling motor centerline. The constant velocity joint 30 could also be positioned in a bent housing 58 in the FIG. 2 example.

It may now be fully appreciated that the above disclosure provides significant advancements to the art of constructing constant velocity connections for use in drill strings. In examples described above, the ball-and-socket joints 34 are robust, economical to manufacture and assemble, and accomplish a desired result of transmitting torque and rotation from an articulating rotor of the drilling motor 18 of FIG. 2, and/or through the bent housing 58 of FIGS. 2 & 6.

A constant velocity connection 30 is described above for use in a drill string 12. In one example, the constant velocity connection 30 can include at least one ball-and-socket joint 34 and an insert 42 rotationally received in an opening 44 formed laterally through a ball 38 of the joint 34.

The insert 42 may rotate about a first axis 48 relative to the ball 38. A socket 40 of the joint 34 can rotate about the first axis 48 relative to the ball 38.

The first axis 48 is preferably perpendicular to the opening 44.

The constant velocity connection 30 can also include a second axis 52 perpendicular to the first axis 48. The socket 40 can also rotate about the second axis 52 relative to the ball 38.

The insert 42 may be generally disk shaped.

The constant velocity connection 30 can also include a journal 46 which extends through the insert 42. The socket 40 may rotate about the journal 46. The socket 40 may also rotate about an axis 48 perpendicular to the journal 46.

The constant velocity connection 30 can include two ball-and-socket joints 34 (although other numbers of joints may be used in other examples). The ball-and-socket joints 34 may be positioned at opposite respective ends of a shaft 36.

The shaft 36 may transmit torque between a drilling motor 18 and a drill bit 26. The shaft 36 may transmit torque through a bent housing 58.

A method of constructing a constant velocity connection 30 is also described above. In one example, the method can comprise: installing an insert 42 in an opening 44 formed in a ball 38 of at least one ball-and-socket joint 34 of the constant velocity connection 30; and allowing the insert 42 to rotate in the opening 44 about a first lateral axis 48.

The opening 44 may extend laterally through the ball 38. The opening 44 can be perpendicular to the first axis 48.

The method can include positioning a socket 40 of the ball-and-socket joint 34 over the ball 38. The positioning step may be performed after the insert 42 installing step.

The method can include inserting a journal 46 through the insert 42 and at least partially into the socket 40. The socket 40 may rotate about a second axis 52 which extends through the journal 46.

The method can include positioning the ball-and-socket joints 34 at opposite respective ends of a shaft 36.

The method can include connecting the shaft 36 between a drilling motor 18 and a drill bit 26. The shaft 36 may transmit torque through a bent housing 58.

A drill string 12 is also described above. In one example, the drill string 12 can include a drilling motor 18, a drill bit 26 and a constant velocity connection 30 connected between the drilling motor 18 and the drill bit 26, the constant velocity connection 30 including at least one ball-and-socket joint 34, and an insert 42 rotationally received in an opening 44 formed laterally through a ball 38 of the joint 34.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A constant velocity connection for use in a drill string, the constant velocity connection comprising:
   at least one ball-and-socket joint;
   an insert rotationally received in an opening formed laterally through a ball of the joint, wherein the insert rotates about a first axis relative to the ball, and wherein a socket of the joint rotates about the first axis relative to the ball; and
   a journal which extends through the insert and at least partially into the socket, and wherein the socket rotates about the journal.

2. The constant velocity connection of claim 1, wherein the first axis is perpendicular to the opening.

3. The constant velocity connection of claim 1, further comprising a second axis perpendicular to the first axis, and wherein the socket also rotates about the second axis relative to the ball.

4. The constant velocity connection of claim 1, wherein the insert is generally disk shaped.

5. The constant velocity connection of claim 1, wherein the socket also rotates about an axis perpendicular to the journal.

6. The constant velocity connection of claim 1, wherein the at least one ball-and-socket joint comprises first and second ball-and-socket joints, and wherein the ball-and-socket joints are positioned at opposite respective ends of a shaft.

7. The constant velocity connection of claim 6, wherein the shaft transmits torque between a drilling motor and a drill bit.

8. The constant velocity connection of claim 6, wherein the shaft transmits torque through a bent housing.

9. A method of constructing a constant velocity connection, the method comprising:
   installing an insert in an opening formed laterally in a ball of at least one ball-and-socket joint of the constant velocity connection;
   allowing the insert to rotate in the opening about a first lateral axis relative to the ball;
   positioning a socket of the ball-and-socket joint over the ball; and
   installing a journal through the insert and at least partially into the socket, wherein the socket rotates about the journal.

10. The method of claim 9, wherein the opening extends laterally through the ball.

11. The method of claim 9, wherein the opening is perpendicular to the first axis.

12. The method of claim 9, wherein the positioning is performed after the installing.

13. The method of claim 9, wherein the second axis extends through the journal and is perpendicular to the first lateral axis.

14. The method of claim 9, wherein the at least one ball-and-socket joint comprises first and second ball-and-socket joints, and further comprising positioning the ball-and-socket joints at opposite respective ends of a shaft.

15. The method of claim 14, further comprising connecting the shaft between a drilling motor and a drill bit.

16. The method of claim 14, further comprising the shaft transmitting torque through a bent housing.

17. A drill string, comprising:
    a drilling motor;
    a drill bit; and
    a constant velocity connection connected between the drilling motor and the drill bit, the constant velocity connection comprising:
      at least one ball-and-socket joint;
      an insert rotationally received in an opening formed laterally through a ball of the joint wherein the insert rotates about a first axis relative to the ball, and wherein a socket of the joint rotates about the first axis relative to the ball; and
      a journal which extends through the insert and at least partially into the socket, and wherein a socket of the joint rotates about the journal.

18. The drill string of claim 17, wherein the first axis is perpendicular to the opening.

19. The drill string of claim 17, further comprising a second axis perpendicular to the first axis, and wherein the socket also rotates about the second axis relative to the ball.

20. The drill string of claim 17, wherein the insert is generally disk shaped.

21. The drill string of claim 17, wherein the socket also rotates about an axis perpendicular to the journal.

22. The drill string of claim 17, wherein the at least one ball-and-socket joint comprises first and second ball-and-socket joints, and wherein the ball-and-socket joints are positioned at opposite respective ends of a shaft.

23. The drill string of claim 22, wherein the shaft transmits torque between the drilling motor and the drill bit.

24. The drill string of claim 22, wherein the shaft transmits torque through a bent housing.

\* \* \* \* \*